United States Patent [19]

Temkin

[11] Patent Number: 4,675,900
[45] Date of Patent: Jun. 23, 1987

[54] WIRE TERMINAL PANEL FOR BUILDING CABLE SYSTEM

[75] Inventor: Gregg A. Temkin, Evanston, Ill.

[73] Assignee: Homaco, Inc., Chicago, Ill.

[21] Appl. No.: 817,292

[22] Filed: Jan. 9, 1986

[51] Int. Cl.[4] .............................................. H04Q 1/14
[52] U.S. Cl. ................................... 379/327; 379/329; 361/428; 361/429
[58] Field of Search ............... 179/91 R, 98; 361/340, 361/341, 427, 428, 429, 359, 338, 339, 391; 339/75 M; 312/120, 127, 313, 327; 220/331, 329

[56] References Cited

U.S. PATENT DOCUMENTS

| | | | |
|---|---|---|---|
| 1,779,058 | 10/1930 | Borgmann et al. | 179/91 R |
| 1,809,025 | 6/1931 | Cruser | 179/91 R |
| 2,572,617 | 10/1951 | Haury et al. | 361/429 |
| 2,572,618 | 10/1951 | Haury et al. | 361/429 |
| 3,784,728 | 1/1974 | De Bortoli et al. | 174/60 |
| 3,904,936 | 9/1975 | Hamrick, Jr. et al. | 317/118 |

Primary Examiner—James L. Dwyer
Assistant Examiner—Lawrence G. Fess
Attorney, Agent, or Firm—Anthony S. Zummer

[57] ABSTRACT

In a building cable system, a building cable has a portion for carrying electronic data signals for networked digital computers and a second portion for carrying electronic telephonic signals for telephone instruments. The system includes a relay rack with a data cross connect panel connected to the data signal carrying portion of the building cable for carrying data signals. A wire terminal panel is mounted on the relay rack. The wire terminal panel includes a pair of supports fixed to the relay rack. A pivot pin is mounted on each of the supports. A telephone block bulkhead is pivotally mounted on the pivot pins to pivot relative to the supports and the relay rack. A bulkhead lock releasably connects the telephone block bulkhead to one of the supports to hold the telephone block bulkhead in a selected position. The telephone block bulkhead includes a wall. A telephone terminal block is mounted on the wall, and the telephone terminal block is connected to the telephonic signal carrying portion of the building cable.

21 Claims, 6 Drawing Figures

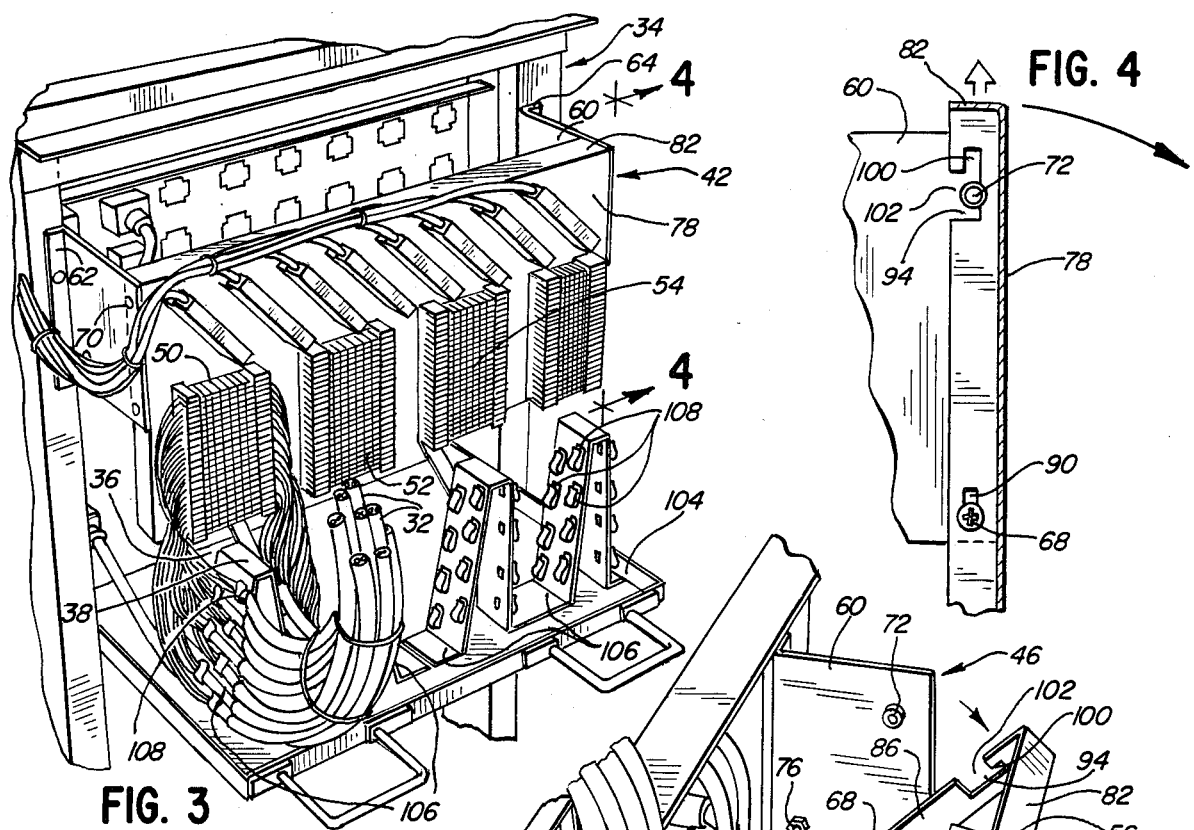
FIG. 3
FIG. 4
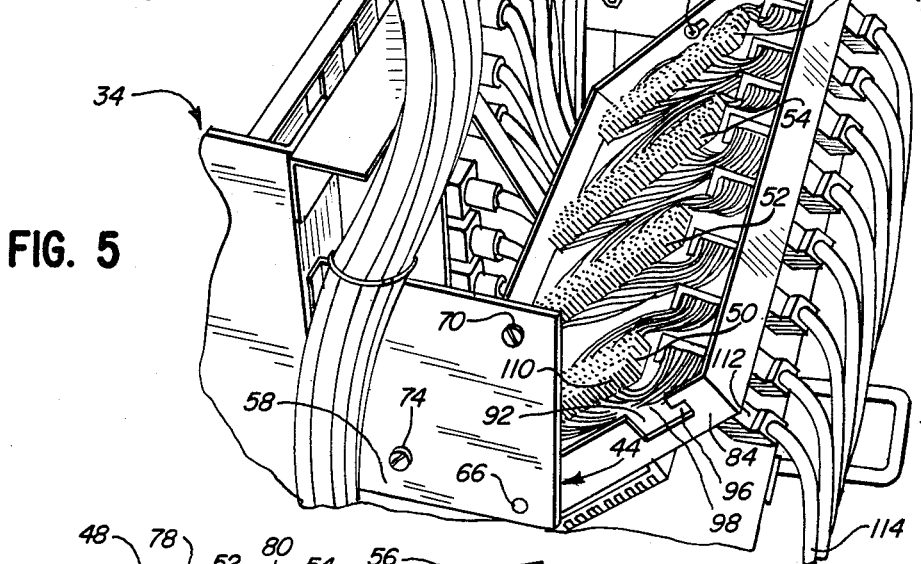
FIG. 5
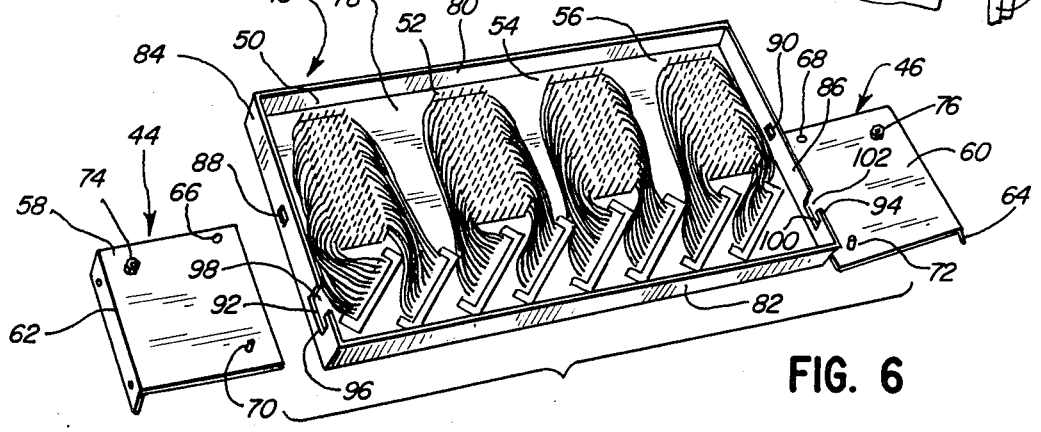
FIG. 6

WIRE TERMINAL PANEL FOR BUILDING CABLE SYSTEM

BACKGROUND OF THE INVENTION

The use of digital computers in finance, business, and industry is widely accepted. As the computers have become a principal central depository for recording and storing information for a given business or other entity, more and more individuals have terminals and small computers which are networked with each other and with a central computer. The networking of computers and terminals requires that computer cables be connected between the various computers and terminals through data cross connect panels.

The expansion of the number of computers and terminals which are utilized requires that various individuals communicating via computer also have a voice interchange of information for direction, inquiry, explanation, or other reasons. The voice communication is achieved through the utilization of ordinary telephone instruments which are connected through telephone blocks and a switching system.

In certain installations, a building cable system is utilized wherein a single cable is provided for the transmission of data signals and voice signals. The building cable has an appropriate number of data signal transmitting wires which data signal transmitting wires are shielded in a group to avoid extraneous signals. The building cable also includes electronic telephonic signal carrying wires.

The building cable is expensive and it is desirable to utilize a minimum amount of building cable in each installation. It is desirable to keep the building cable as a single cable for the greatest distance possible before the telephonic signal portion of the cable is split away from the shielded data signal carrying portion of the cable.

The heretofore known system for utilizing a building cable system which carries both data signals and telephonic signals is to lay the cable to a given point where the cable is split. The portion of the cable adapted for carrying telephonic signals is connected to a building wall mounted telephone block, and the portion adapted for carrying the data signals is connected to a data cross connect panel mounted on a relay rack.

It is one of the objects of the present invention to provide an improved telephone wire terminal panel. The wire terminal panel is adapted for mounting on a relay rack which also has the data cross connect panel. The wire terminal panel includes a telephone block bulkhead which is pivotal relative to the relay rack but may be locked in a selected position. The telephone block bulkhead has a telephone block mounted thereon. The portion of the building cable which carries the telephonic signals is connected to the telephone block. Conventional telephone cables are carried away from the telephone block. The data cross connect panel, which is mounted on a conventional relay rack, distributes the wires to computers and computer terminals for networking computers and computer terminals.

SUMMARY OF THE INVENTION

A building cable system includes a building cable having a portion particularly adapted for carrying data signals for networked computers and parts thereof and a second portion for carrying telephonic signals for telephone instruments. A data cross connect panel is connected to the data signal carrying portion of the building cable. A wire terminal panel is mounted on the relay rack. The wire terminal panel includes a pair of supports mounted on the relay rack. A pivot pin is mounted on each of the supports. A telephone block bulkhead is pivotally mounted on the pivot pins to pivot relative to the relay rack. A bulkhead lock releasably connects the bulkhead to one of the supports to hold the telephone block bulkhead in a selected position relative to the relay rack. The telephone block bulkhead includes a wall. A telephone terminal block is mounted on the wall and the telephone terminal block is connected to the telephonic signal carrying portion of the building cable. The telephone block bulkhead is pivoted to allow access to the rear of the data cross connect panel.

BRIEF DESCRIPTION OF THE DRAWINGS

FIG. 3 is a perspective view of a wire terminal panel embodying the present invention mounted on a conventional relay rack showing portions of certain building cables and certain building cables not shown for purposes of clarity;

FIG. 4 is a cross sectional view taken on Line 4—4 of FIG. 3 showing a releasable locking connection between a telephone block bulkhead and a support;

FIG. 5 is a perspective view showing the telephone block bulkhead tilted to allow access to the rear of the data cross connect panel; and FIG. 6 is a perspective view showing one side of the telephone block bulkhead with telephone blocks mounted thereon and supports positioned in a flat attitude adjacent to opposed ends of the telephone block bulkhead to show better the construction of the supports.

DESCRIPTION OF THE PREFERRED EMBODIMENT

Figures 1, 2:
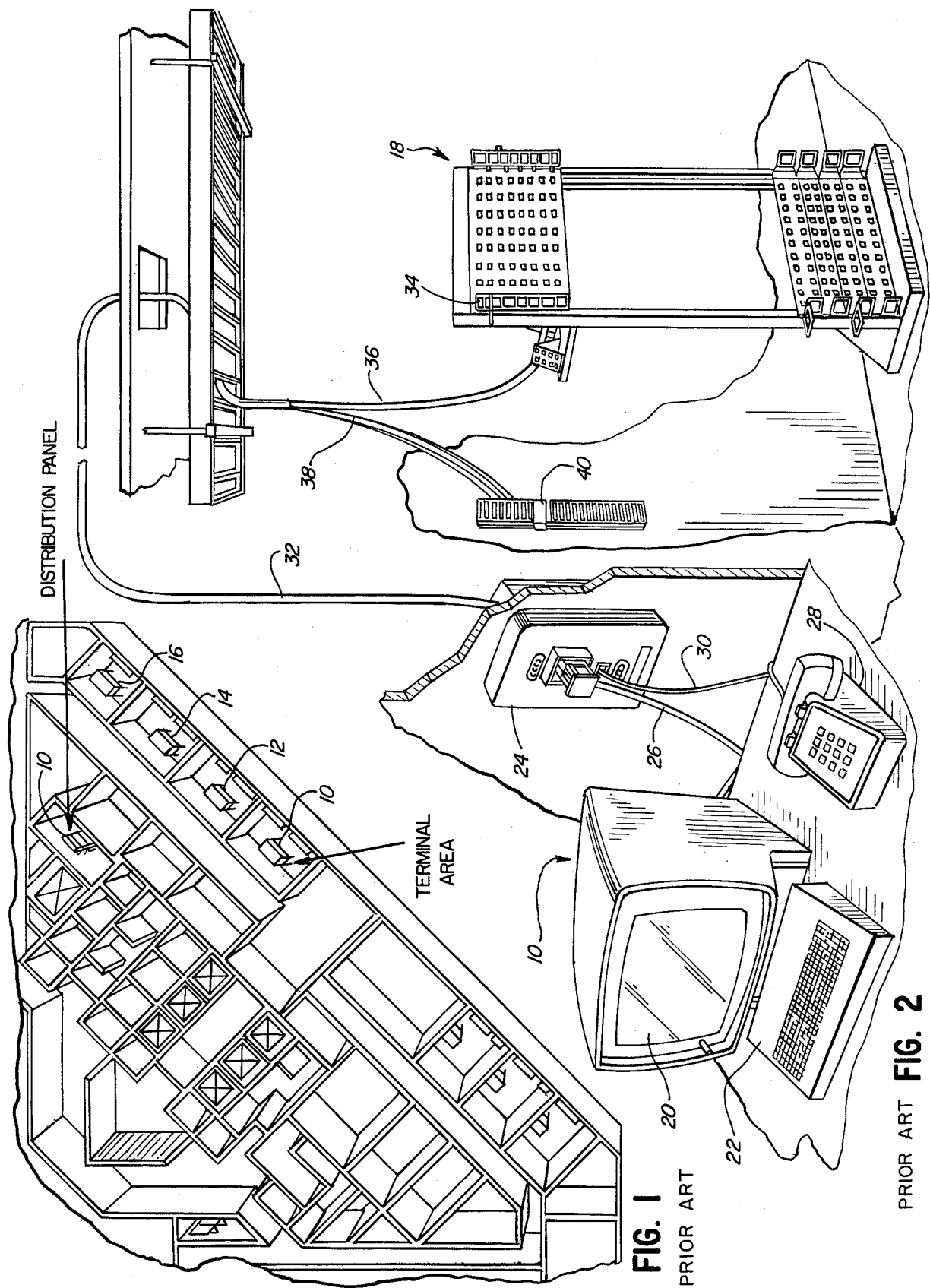
FIG. 1 is a plan view of a typical prior art office arrangement utilizing a plurality of computers and telephone instruments.
FIG. 2 is a perspective diagrammatic view showing a well known prior art arrangement of a conventional CRT, a conventional keyboard and a conventional telephone instrument connected to an outlet through a jack with a building cable running to the point where the cable is split with a portion for carrying telephone signals connected to a conventional telephone terminal block and a portion for carrying data signals connected to a data cross connect panel mounted on a relay rack.

Referring now to the drawings and especially to FIG. 1, a general floor plan is shown for an office having a digital computer and telephone building system. The system includes terminals 10, 12, 14, and 16 which are located in separate offices. The instant building system also includes a conventional relay rack 18 with a data cross connect panel which is connected to terminals 10, 12, 14 and 16.

Referring now to FIG. 2, a prior art construction is shown therein for a single terminal's connection to a conventional data cross connect system. A terminal 10 is shown therein with a CRT 20 connected to a keyboard 22. The CRT and keyboard are connected to a conventional outlet 24 through a cable 26. The outlet includes a conventional receptacle and a jack. A conventional telephone instrument 28 is also connected to outlet 24 through a cable 30. The outlet is connected to one end of a conventional building cable 32. The other end of the building cable is split into two parts.

Cable 32 is conventional in its construction in that the cable has a portion with a plurality of wires which are protected by an electronic shielding sheath which portion is a data signal-carrying portion and is generally identified by numeral 36. Cable 32 also includes a second portion 38 which has a plurality of telephone wires outside of the sheath but inside of a cover for the cable. Second portion 38 is a telephonic signal carrying portion of the cable. The data signal carrying portion is connected to a data cross connect panel 34 which is mounted on relay rack 18, and the telephonic signal carrying portion is connected to a conventional telephone terminal block 40 mounted on a building wall as is conventional.

The system described above is the conventional and well-known building system for interconnecting terminals into a network including computers and telephone instruments. The computers and telephone instrument cables are routed to an equipment room wherein the data signals are delivered to a data cross connect panel and the telephone signals are delivered to a conventional building wall-mounted telephone block. The present improvement is a telephone wire terminal panel which is mounted on the relay rack and carries conventional telephone terminal blocks as part of the wire terminal panel. The present invention places the split in the building cable adjacent to the telephone block and the relay rack to make a compact installation and reduce cable usage.

Referring now to FIGS. 3 through 6, a specific embodiment ment of the present invention is shown therein. Like numbers are used for like parts in FIGS. 3 through 6 as were used in FIGS. 1 and 2 to show how conventional and well known parts and pieces of equipment are used with the specific embodiment of the instant invention. FIG. 3 shows a relay rack with a wire terminal panel 42 mounted therein, which wire terminal panel is a specific embodiment of the herein disclosed invention. The wire terminal panel includes a pair of supports 44 and 46 which are fixed to the relay rack. A telephone block bulkhead 48 is pivotally connected to supports 44 and 46. Conventional telephone blocks 50, 52, 54 and 56 are mounted on the telephone block bulkhead in a conventional manner. Each of the telephone blocks includes insulation displacement wire contacts so that each block may be quickly and easily wired.

Supports 44 and 46 include flat side walls 58 and 60, respectively. Ears 62 and 64 are formed integral with side walls 58 and 60, respectively. Ears 62 and 64 are perpendicular to the respective side walls. The ears are fixed to the relay rack by conventional fasteners so that the side walls 58 and 60 are parallel to each other and extend away from the relay rack when the supports are mounted on the relay rack.

Side walls 58 and 60 have pivot pins 66 and 68 mounted thereon, respectively, with the pins extending toward each other. The pivot pins are aligned and parallel to each other so that the pivot pins are on the same center line. Walls 58 and 60 have lock pins 70 and 72, respectively, mounted thereon with the lock pins extending toward each other. Lock pins 70 and 72 are also parallel to each other and are aligned so that the lock pins are on the same center line. The center line of the lock pins is parallel to the center line of the pivot pins so that the lock pins are parallel to the pivot pins. Stop pins 74 and 76 are mounted on side walls 58 and 60, respectively. Stop pins 74 and 76 are parallel to each other and aligned so that the stop pins are on the same center line. The stop pins are parallel to pivot pins 66 and 68 and lock pins 70 and 72. Each of the stop pins is on the same side of the respective side wall as the respective pivot pin and the respective lock pin so that the stop pins also extend toward each other.

Telephone block bulkhead 48 includes a rectangular bulkhead wall 78. A bottom ledge 80 is formed with the lower edge of wall 78, and a top ledge 82 is formed integral with the top edge of wall 78. Top ledge 82 and lower ledge 80 are perpendicular to wall 78, are parallel to each other, and extend outward from the wall in the same direction. A rib 84 is formed integral with one edge of wall 78 which rib 84 is perpendicular to the top and bottom edges, and a rib 86 is also formed integral with the opposite edge of wall 78. Ribs 84 and 86 are perpendicular to the wall, are parallel to each other, and extend outward from the wall in the same direction as the top ledge and the bottom ledge.

Elongated pivot slots 88 and 90 are formed in ribs 84 and 86, respectively. The elongated slots are aligned with each other and the length of the slots is parallel to the respective edge with which the respective rib is formed integral. Lock slots 92 and 94 are formed in ribs 84 and 86, respectively. Lock slot 92 includes an elongated locking slot 96 and an opening 98. Lock slot 94 includes an elongated locking slot 100 and an opening 102. Lock slots 92 and 94 are aligned with each other. Locking slot 96 is also aligned and has its length parallel to pivot slot 88. In like manner, locking slot 100 is aligned and has its length parallel to pivot slot 90.

Data cross connect panel 34 includes a tray 104 which has a plurality of conventional and well known identical clip brackets 106 mounted therein. Each of the clip brackets includes a plurality of identical clips 108 mounted thereon. Clips 108 are particularly adapted for holding portion 36 of the building system cable.

As was mentioned above, the wire terminal panel is mounted on the relay rack. The wire terminal panel is mounted above tray 104 and adjacent to the clip brackets. Supports 44 and 60 are secured to the relay rack, and bulkhead 48 is pivotally mounted between the supports. Pivot pins 66 and 68 are slideably and pivotally mounted in pivot slots 88 and 90, respectively, so that the bulkhead may pivot about the pivot pins and also be moved vertically along the length of the pivot slots. Lock pins 70 and 72 are positionable in lock slots 92 and 94, respectively. The bulkhead is pivoted toward the lock pins with the bulkhead raised so that the lock pins 70 and 72 may be positioned in elongated locking slots 96 and 100 through openings 98 and 102, respectively. When the lock pins are positioned in their respective locking slots, the bulkhead is allowed to drop so that the bulkhead is locked to the supports.

Referring now to FIG. 3, it may be seen that cables are not shown connected to three of the clip brackets. A plurality of building system cables 32 is shown mounted in one of the brackets. For purposes of illustration, only one of the cables is described herein with the understanding that all of the cables are connected in a similar manner. The data signal carrying portion 36 of the cable 32 with its sheath is positioned in one of the clips 108 and that portion is positioned under the bulkhead for conventional and well known connection to the data cross connect panel which is mounted on the relay rack. Telephonic signal portion 38 is split off from the sheathed data signal carrying portion and that portion 38 is connected in a conventional and well known manner to conventional telephone block 50. It is to be understood that each building system cable is split at the clip bracket wherein the data signal carrying portion is held on to the bracket by the clip and is guided under the bulkhead while the telephone signal portion is connected to the appropriate telephone block. As is conventional, the telephone block 50 has a plurality of pins 110 which are appropriately wired and are connected to conventional connectors 112 which have conventional telephone cables 114 connected thereto.

The subject wire terminal panel utilizes a minimum of building system cable since the building system cable is split at the clip bracket. The data signal carrying portion is connected to the data cross connect panel and the telephone signal carrying portion is connected to the telephone blocks adjacent to the data cross connect panel. The construction allows the bulkhead to be released from the lock pins, which constitute a portion of a bulkhead lock, and to be pivoted about the pivot pins until the bulkhead engages stop pins 74 and 76. It may be appreciated that the pivoting of the bulkhead exposes the opposite side of the telephone blocks for any repairs or changes to be effected and allows clear access to the data cross connect panel. Upon completion of whatever changes or maintenance which is required, it is a simple matter to pivot the bulkhead upward simultaneously lifting the bulkhead, and then drop the bulkhead into locking engagement with the lock pins. The present wire terminal panel may be simply installed on a relay rack to minimize the utilization of building system cable and to keep the connections in a single compact location, thereby reducing the space required and simplifying maintenance of the building system cable. Furthermore, there is a reduction in the amount of building system cable which is required, thereby making the overall installation more cost effective.

Although a specific embodiment of the herein disclosed invention has been shown and described in detail above, it is readily apparent that those skilled in the art may make various modifications and changes without departing from the spirit and scope of the present invention. It is to be expressly understood that the instant invention is limited only by the appended claims.

I claim:

1. In a building cable system including, a building cable having a portion for carrying data signals for networked computers and parts thereof and a second portion for carrying telephonic signals for telephone instruments, a data cross connect panel connected to the data signal carrying portion of the building cable for carrying data signals, and a relay rack supporting the data cross connect panel, the improvement comprising; a wire terminal panel mounted on the relay rack, said wire terminal panel comprising, a pair of supports mounted on the relay rack, a pivot pin mounted on each of the supports, a telephone block bulkhead pivotally mounted on the pivot pins, a bulkhead lock releasably connecting the bulkhead to one of the supports to hold the telephone block bulkhead in a selected position, said telephone block bulkhead including a bulkhead wall, and a telephone terminal block mounted on the wall, said telephone terminal block being connected to the telephonic signal carrying portion of the building cable.

2. In a building cable system including, a building cable having a portion for carrying data signals for networked computers and parts thereof and a second portion for carrying telephonic signals for telephone instruments, a data cross connect panel connected to the data signal carrying portion of the building cable for carrying data signals, and a relay rack supporting the data cross connect panel as defined in claim 1, wherein said bulkhead lock includes a lock pin mounted on one of said supports, a rib fixed to one edge of the wall and being substantially perpendicular thereto, said rib having a lock slot formed therein removably receiving the lock pin for releasably locking the bulkhead to the support having the lock pin.

3. In a building cable system including, a building cable having a portion for carrying data signals for networked computers and parts thereof and a second portion for carrying telephonic signals for telephone instruments, a data cross connect panel connected to the data signal carrying portion of the building cable for carrying data signals, and a relay rack supporting the data cross connect panel as defined in claim 1, including a stop connected to one of the supports, said stop engageable with the telephone block bulkhead to limit movement of the bulkhead in one direction.

4. In a building cable system including, a building cable having a portion for carrying data signals for networked computers and parts thereof and a second portion for carrying telephonic signals for telephone instruments, a data cross connect panel connected to the data signal carrying portion of the building cable for carrying data signals, and a relay rack supporting the data cross connect panel as defined in claim 1, including a stop pin mounted on each support, said stop pins being engageable with the telephone block bulkhead to limit movement of the bulkhead in one direction.

5. In a building cable system including, a building cable having a portion for carrying data signals for networked computers and parts thereof and a second portion for carrying telephonic signals for telephone instruments, a data cross connect panel connected to the data signal carrying portion of the building cable for carrying data signals, and a relay rack supporting the data cross connect panel as defined in claim 1, wherein each of said supports includes a mounting ear connected to the relay rack and a side wall formed integral with the mounting ear and extending away from the relay rack, and said bulkhead lock including a pair of lock pins mounted on respective side walls selectively engageable with the bulkhead for selectively locking the bulkhead to the supports.

6. In a building cable system including, a building cable having a portion for carrying data signals for networked computers and parts thereof and a second portion for carrying telephonic signals for telephone instruments, a data cross connect panel connected to the data signal carrying portion of the building cable for carrying data signals, and a relay rack supporting the data cross connect panel as defined in claim 1, wherein said pivot pins are in a straight line, said bulkhead being pivotally engageable with the pivot pins at the lower half of the bulkhead.

7. In a building cable system including, a building cable having a portion for carrying data signals for networked computers and parts thereof and a second portion for carrying telephonic signals for telephone instruments, a data cross connect panel connected to the data signal carrying portion of the building cable for carrying data signals, and a relay rack supporting the data cross connect panel as defined in claim 1, wherein the telephone block bulkhead includes a top ledge formed integral with the uppermost portion of the wall and a lower ledge formed integral with the lowermost portion of the wall.

8. In a building cable system including, a building cable having a portion for carrying data signals for networked computers and parts thereof and a second portion for carrying telephonic signals for telephone instruments, a data cross connect panel connected to the data signal carrying portion of the building cable for carrying data signals, and a relay rack supporting the data cross connect panel as defined in claim 1, wherein the telephone terminal block includes a plurality of insulation displacement wire contacts.

9. In a building cable system including, a building cable having a portion for carrying data signals for networked computers and parts thereof and a second portion for carrying telephonic signals for telephone instruments, a data cross connect panel connected to the data signal carrying portion of the building cable for carrying data signals, and a relay rack supporting the data cross connect panel as defined in claim 1, wherein the bulkhead includes a rib fixed to one edge of said wall and being substantially perpendicular thereto, said bulkhead lock includes a lock pin mounted on one of said supports, said rib having a lock slot formed therein removably receiving the lock pin for releasably locking the bulkhead to the support, said lock slot having an opening adjacent to the relay rack for receiving the lock pin.

10. In a building cable system including, a building cable having a portion for carrying data signals for networked computers and parts thereof and a second portion for carrying telephonic signals for telephone instruments, a data cross connect panel connected to the data signal carrying portion of the building cable for carrying data signals, and a relay rack supporting the data cross connect panel as defined in claim 1, wherein said pair of pivot pins are substantially aligned on the same center line, said bulkhead lock including a lock pin on each of said supports, said lock pins being substantially aligned, a rib fixed to each of opposed edges of said wall, said ribs being substantially perpendicular to the wall, each of said ribs having a lock slot formed therein removably receiving the lock pin for releasably locking the bulkhead to the supports, and each of said ribs having a pivot slot receiving a respective pivot pin.

11. In a building cable system including, a building cable having a portion for carrying data signals for networked computers and parts thereof and a second portion for carrying telephonic signals for telephone instruments, a data cross connect panel connected to the data signal carrying portion of the building cable for carrying data signals, and a relay rack supporting the data cross connect panel as defined in claim 1, wherein each of said supports includes a mounting ear connected to the relay rack and a side wall formed integral with the mounting ear, each of said side walls extending away from the relay rack, said pivot pins mounted on respective side walls, said pivot pins being aligned on a straight line, and said bulkhead lock including a pair of lock pins mounted on the respective side walls, said lock pins selectively engageable with the bulkhead for selectively locking the bulkhead to the supports.

12. In a building cable system including, a building cable having a portion for carrying data signals for networked computers and parts thereof and a second portion for carrying telephonic signals for telephone instruments, a data cross connect panel connected to the data signal carrying portion of the building cable for carrying data signals, and a relay rack supporting the data cross connect panel as defined in claim 1, wherein the telephone block bulkhead includes a top ledge formed integral with the upper edge of the wall and a lower ledge formed integral with the lower edge of the wall, each of said supports includes a mounting ear connected to the relay rack and a side wall formed integral with the mounting ear, each of said side walls extending away from the relay rack, and said bulkhead lock includes a pair of lock pins mounted on respective side walls, said lock pins being aligned on a straight line, said lock pins being selectively engageable with the bulkhead for selectively locking the bulkhead to the supports.

13. In a building cable system including, a building cable having a portion for carrying data signals for networked computers and parts thereof and a second portion for carrying telephonic signals for telephone instruments, a data cross connect panel connected to the data signal carrying portion of the building cable for carrying data signals, and a relay rack supporting the data cross connect panel as defined in claim 1, wherein each of said supports includes a mounting ear connected to the relay rack and a side wall formed integral with the mounting ear, said side walls extending away from the relay rack, said bulkhead including a pair of parallel ribs fixed to opposite edges of said wall, said ribs being substantially perpendicular to the wall, said bulkhead lock including a lock pin mounted on each of the side walls of the support, said ribs each having a lock slot formed therein removably receiving respective lock pins and releasably locking the bulkhead to the supports, each of said lock slots having an opening adjacent to the relay rack for receiving respective lock pins.

14. In a building cable system including, a building cable having a portion for carrying data signals for networked computers and parts thereof and a second portion for carrying telephonic signals for telephone instruments, a data cross connect panel connected to the data signal carrying portion of the building cable for carrying data signals, and a relay rack supporting the data cross connect panel as defined in claim 1, wherein each of said supports includes a mounting ear connected to the relay rack and a side wall formed integral with the mounting ear, each of said side walls extending away from the relay rack, said side walls being substantially parallel to each other, each of said pivot pins being mounted on a respective side wall, said pair of pivot pins being substantially aligned on the same center line, said bulkhead lock including a lock pin on each of side walls, said lock pins being substantially aligned on the same center line, a rib fixed to opposed edges of said bulkhead wall, said ribs being substantially perpendicular to the bulkhead wall, each of said ribs having a lock slot formed therein removably receiving a respective lock pin for releasably locking the bulkhead to the supports, and each of said ribs having a pivot slot receiving a respective pivot pin.

15. In a building cable system including, a building cable having a portion for carrying data signals for networked computers and parts thereof and a second portion for carrying telephonic signals for telephone instruments, a data cross connect panel connected to the data signal carrying portion of the building cable for carrying data signals, and a relay rack supporting the data cross connect panel as defined in claim 1, wherein the wall of the telephone block bulkhead is rectangular, a top ledge is formed integral with the upper edge of the wall, a lower ledge is formed integral with the lower edge of the wall, a rib is fixed to each of opposed side edges of the wall, said ribs being substantially perpendicular to the wall, said pair of pivot pins being substantially aligned on the same center line, each of said ribs having a pivot slot receiving a respective pivot pin, said bulkhead lock including a lock pin fixed to each of said supports, and each of said ribs having a lock slot formed therein removably receiving the respective lock pin for releasably locking the bulkhead to the supports.

16. In a building cable system including, a building cable having a portion for carrying data signals for networked computers and parts thereof and a second portion for carrying telephonic signals for telephone instruments, a data cross connect panel connected to the data signal carrying portion of the building cable for carrying data signals, and a relay rack supporting the data cross connect panel as defined in claim 1, wherein each of the supports includes a mounting ear connected to the relay rack and a side wall formed integral with each mounting ear, said side walls extending away from the relay rack, a stop pin mounted on each side wall and engageable with the telephone block bulkhead to limit movement of the bulkhead in one direction, said telephone block bulkhead including a top ledge formed integral with the uppermost edge of the bulkhead wall and a lower ledge formed integral with the lowermost portion of the bulkhead wall, and said bulkhead lock including a lock pin mounted on each of the side walls, said lock pins being selectively engageable with the bulkhead for selectively locking the bulkhead to the supports.

17. In a building cable system including, a building cable having a portion for carrying data signals for networked computers and parts thereof and a second portion for carrying telephonic signals for telephone instruments, a data cross connect panel connected to the data signal carrying portion of the building cable for carrying data signals, and a relay rack supporting the data cross connect panel as defined in claim 1, wherein each of said supports includes a mounting ear connected to the relay rack and a side wall formed integral with each mounting ear, said side walls extending away from the relay rack, said side walls being substantially parallel to each other, a stop pin mounted in each side wall and engageable with the telephone block bulkhead to limit movement of the bulkhead in one direction, said bulkhead lock including a lock pin mounted on each of the side walls, said bulkhead includes a pair of ribs, each of said ribs fixed to one edge of the bulkhead wall and being substantially perpendicular thereto, said ribs being substantially parallel to each other, each of said ribs having a lock slot formed therein removably receiving its respective lock pin for releasably locking the bulkhead to the respective side wall, and each lock slot having an opening adjacent to the relay rack for receiving its respective lock pin.

18. In a building cable system including, a building cable having a portion for carrying data signals for networked computers and parts thereof and a second portion for carrying telphonic signals for telephone instruments, a data cross connect panel connected to the data signal carrying portion of the building cable for carrying data signals, and a relay rack supporting the data cross connect panel as defined in claim 1, wherein each of said supports includes a mounting ear connected to the relay rack and a side wall formed integral with the mounting ear, said side walls extending away from the relay rack, each of said pivot pins being mounted on a respective side wall, said pivot pins being substantially aligned on the same center line, a rib fixed to each of a pair of opposed edges of said bulkhead wall, said ribs being substantially perpendicular to the bulkhead wall, said bulkhead lock including a lock pin on each of the side walls, said lock pins being substantially aligned on the same center line, each of said ribs having a lock slot formed therein removably receiving a respective lock pin for releasably locking the bulkhead to the supports, each of said ribs having a pivot slot receiving a respective pivot pin, and a stop pin connected to each of the side walls engageable with a respective rib to limit movement of the bulkhead in one direction.

19. In a building cable system including, a building cable having a portion for carrying data signals for networked computers and parts thereof and a second portion for carrying telephonic signals for telephone instruments, a data cross connect panel connected to the data signal carrying portion of the building cable for carrying data signals, and a relay rack supporting the data cross connect panel as defined in claim 1, wherein said pair of pivot pins being substantially aligned on the same center line, said telephone block bulkhead wall being substantially rectangular having a top ledge formed integral with the uppermost edge of the wall, a lower ledge formed integral with the lowermost edge of the wall, a pair of ribs formed integral with opposed edges of the wall, said ribs being substantially perpendicular to the wall, a stop pin mounted on each support and being engageable with the respective rib of the bulkhead to limit movement of the bulkhead in one direction, said bulkhead lock including a lock pin fixed to each of said supports, said lock pins being substantially aligned on the same center line, each of said ribs having a lock slot formed therein removably receiving the respective lock pin for releasably locking the bulkhead to the supports, and each of said ribs having a pivot slot receiving a respective pivot pin.

20. In a building cable system including, a building cable having a portion for carrying data signals for networked computers and parts thereof and a second portion for carrying telephonic signals for telephone instruments, a data cross connect panel connected to the data signal carrying portion of the building cable for carrying data signals, and a relay rack supporting the data cross connect panel as defined in claim 1, wherein each of said supports includes a mounting ear connected to the relay rack and a side wall formed integral with the mounting ear, said side walls extending away from the relay rack, each of said pivot pins being mounted on a respective side wall, said pivot pins being substantially aligned on the same center line, a rib fixed to each of a pair of opposed edges of said bulkhead wall, said ribs being substantially perpendicular to the bulkhead wall, said bulkhead lock including a lock pin on each of the side walls, said lock pins being substantially aligned on the same center line, each of said ribs having a lock slot formed therein removably receiving a respective lock pin for releasably locking the bulkhead to the supports, each of said ribs having a pivot slot receiving a respective pivot pin, and a stop pin connected to each of the side walls engageable with a respective rib to limit movement of the bulkhead in one direction, and said telephone terminal block including a plurality of insulation displacement wire contacts.

21. In a building cable system including, a building cable having a portion for carrying data signals for networked computers and parts thereof and a second portion for carrying telephonic signals for telephone instruments, a data cross connect panel connected to the data signal carrying portion of the building cable for carrying data signals, and a relay rack supporting the data cross connect panel as defined in claim 1, wherein the telephone block bulkhead wall is rectangular, the wall includes a top ledge formed integral with the uppermost portion of the wall, a lower ledge formed integral with the lowermost portion of the wall, a pair of ribs formed integral with the remaining opposed edges of the wall, said top ledge, lower ledge and ribs being substantially perpendicular to the wall; each of said supports including a mounting ear connected to the relay rack and a side wall formed integral with each mounting ear, said side walls extending away from the relay rack, said bulkhead lock including a lock pin mounted on each of the side walls, said lock pins extending toward each other and being in line, each of said pivot pins being mounted on each of the side walls extending toward each other, said pivot pins having the center lines in substantial alignment, each of said pivot pins being on the same side of the respective side walls as the lock pins mounted on that side wall, said pivot pins being parallel to the lock pins, a stop pin fixed to each of the side walls on the same side of each side wall as the lock pin, said stop pins being engageable with respective ribs of the bulkhead to limit movement of the bulkhead in one direction, each of said ribs having a lock slot formed therein removably receiving a respective lock pin for releasably locking the bulkhead to the respective side wall, each of said lock slots having an opening adjacent to the relay rack for receiving the lock pin, and each of said ribs having a pivot slot receiving the respective pivot pin, each of said pivot slots being parallel to the lock slot in the same rib.

* * * * *